US005237633A

United States Patent [19]

Gaw et al.

[11] Patent Number: 5,237,633

[45] Date of Patent: Aug. 17, 1993

[54] MONOLITHIC OPTOELECTRONIC INTEGRATED CIRCUIT

[75] Inventors: Craig A. Gaw, Scottsdale; Paige M. Holm, Phoenix; Kwong-Han H. Leung, Mesa; George W. Rhyne, Scottsdale, all of Ariz.; Daniel L. Rode, St. Louis, Mo.

[73] Assignee: Motorola, Inc., Schaumburg, Ill.

[21] Appl. No.: 791,708

[22] Filed: Nov. 14, 1991

[51] Int. Cl.[5] .......... G02B 6/12

[52] U.S. Cl. .......... 385/14; 307/475; 257/256

[58] Field of Search .......... 385/14, 130; 359/180, 359/181, 182, 2, 8; 307/475; 357/22; 372/38

[56] References Cited

U.S. PATENT DOCUMENTS

| | | | |
|---|---|---|---|
| 4,847,665 | 7/1989 | Mand | 385/130 X |
| 5,029,283 | 7/1991 | Ellsworth et al. | 307/475 |
| 5,097,153 | 3/1992 | Mahler et al. | 307/475 |
| 5,105,104 | 4/1992 | Eisele et al. | 307/481 X |
| 5,105,106 | 4/1992 | Barre | 307/475 |
| 5,107,148 | 4/1992 | Millman | 307/475 |
| 5,111,081 | 5/1992 | Atallah | 307/475 |

OTHER PUBLICATIONS

"Monolithic Integration of an AlGaAs/GaAs DH LED With a GaAs FET Driver" O. Wada et al. IEEE Electron Device Letters, vol. EDL—3, No. 10, Oct., 1982.

"Monolithic Integration of Optoelectronic, Electronic And Passive Components In GaAlAs/GaAs Multilayers" A. C. Carter et al. Electronics letters, Jan. 21, 1982, vol. 18, No. 2.

*Primary Examiner*—John D. Lee
*Assistant Examiner*—Phan Thi Heartney
*Attorney, Agent, or Firm*—Joe E. Barbee; Rennie W. Dover

[57] ABSTRACT

A monolithic optoelectronic integrated circuit having an optical emission portion (18) and a drive portion (11, or 22 and 21). The drive portion is capable of accepting TTL and standard CMOS logic voltage levels. In a first embodiment, the monolithic optoelectronic integrated circuit (10) has a light emitting diode (18) driven by a dual gate FET (11). In a second embodiment, the monolithic optoelectronic integrated circuit (20) has a light emitting diode (18) driven by two FETs (22 and 21). In each embodiment (10 or 20), a gate (13 or 23) of the respective drive circuit accepts the TTL or standard CMOS logic voltage. Further, in each embodiment current limiting is accomplished by coupling a gate with the source of the FET (11 or 22). Thus, the output of the light emitting diode (18, 18) is controlled by an input signal to the drive circuit.

12 Claims, 1 Drawing Sheet

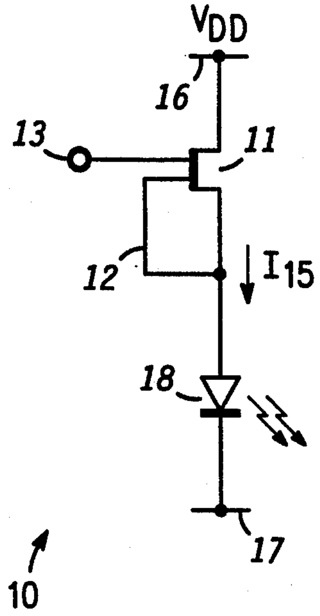
FIG. 1
FIG. 2
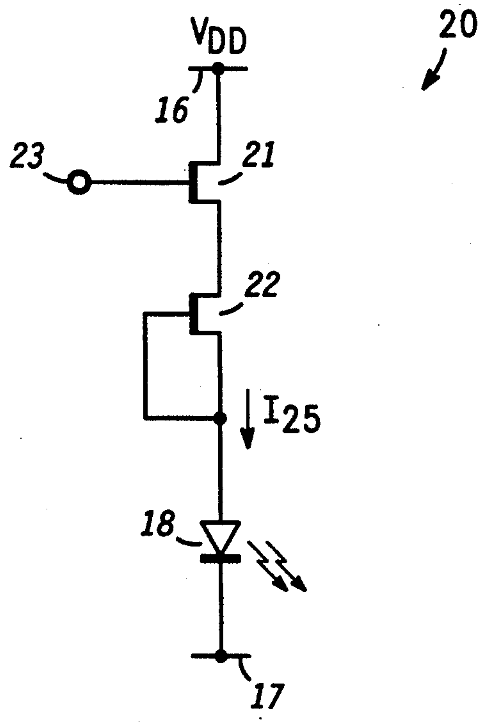

MONOLITHIC OPTOELECTRONIC INTEGRATED CIRCUIT

BACKGROUND OF THE INVENTION

This invention relates, in general, to transmitter optoelectronic integrated circuits, and more particularly to optoelectronic integrated circuits having monolithi7 cally integrated optical emission and drive portions.

Fiber optic transmission systems have emerged as a prominent technology in a variety of disciplines, including: automotive, computer, medical, and communications. Typically, a fiber optic system comprises a transmitting optoelectronic circuit, or transmission source, coupled to a receiver via an optical fiber. Further, in seeking lower cost methods of building optoelectronic systems, manufacturers have begun employing optical fibers made of plastic.

In an effort to exploit the high end communications market, manufacturers of optoelectronic components have leapfrogged the low end communications segment. Hence optoelectronics manufacturers have optimized their products for the high end communications arena, leaving a void in the low end communications market. For instance, most manufacturers of low end optoelectronic components build their optical emissions devices and the circuitry required to drive these devices as separate units. This approach has compelled systems designers who desire to incorporate optical emissions devices into their designs to familiarize themselves with optoelectronic technology.

Further complicating the design process is the inability to directly drive optical emissions devices with systems operating at logic voltage levels compatible with TTL or standard CMOS circuitry. Hence the system logic voltage levels must be translated from those of TTL or standard CMOS to voltage levels compatible with the optical emissions devices. In addition to logic voltage levels, designers must contend with differences in the power supply voltages between the optoelectronics circuitry and the systems circuitry which drive these devices. What is more, there may not only be differences in the voltage level requirements of the power supply but there may also be differences in the polarity requirements of the power supply.

Accordingly, it would be beneficial to have an optoelectronic integrated circuit capable of being driven by logic voltage levels compatible with those of TTL and standard CMOS. Further, it is desirable that in accomplishing this task an improvement in the reliability of the circuitry results. It is further desired that the cost of accomplishing the task of driving an optoelectronic integrated circuit with TTL or standard CMOS voltage levels be minimized. Finally, it would be advantageous for the operation of the optoelectronic integrated circuit to be easily understood by those inexperienced with the characteristics of optoelectronic technology.

SUMMARY OF THE INVENTION

Briefly stated, the present invention is a monolithic optoelectronic integrated circuit. The optoelectronic integrated circuit includes an optical emission device coupled to a drive circuit. The drive circuit has a switching portion, and a current limiting portion which also provides voltage level shifting. In a first embodiment, the drive circuit comprises a dual gate FET. In a second embodiment the drive circuit comprises two FETs. In each embodiment, the drive circuit accepts logic voltage levels compatible with those of TTL and standard CMOS logic circuitry.

BRIEF DESCRIPTION OF THE DRAWINGS

FIG. 1 is a schematic diagram illustrating a dual gate field effect transistor in accordance with the present invention; and FIG. 2 is a schematic diagram illustrating two field effect transistors in accordance with the present invention.

DETAILED DESCRIPTION OF THE DRAWINGS

Typically, transmitter optoelectronic integrated circuits require additional drive circuitry to be compatible with TTL or standard CMOS logic voltage levels. In general, the additional drive circuitry is implemented by employing discrete components. Referring to FIG. 1 and to FIG. 2, first and second monolithic TTL compatible optoelectronic integrated circuits, 10 and 20 respectively, of the present invention are suited to be manufactured using conventional integrated circuit processing techniques.

FIG. 1 shows a schematic diagram of a first embodi7 ment of a monolithic optoelectronic integrated circuit 10 having a dual gate field effect transistor 11 and an optical emission device 18. Dual gate field effect transistor 11, commonly referred to as a dual gate FET 11, drives optical emission device 18. Dual gate FET 1 has a first gate 12, a second gate 13, a drain, and a source. The drain is coupled to a first power supply node or conductor 16, typically operating at a positive power supply voltage, $V_{DD}$. First gate 12 is coupled to the source of dual gate FET 11. Second gate 13 serves as an input for logic signals originating from external circuitry (not shown) which are compatible with TTL and standard CMOS logic circuitry.

Further, in this embodiment optical emission device 18 is a light emitting diode 18 having an anode and a cathode. The anode of light emitting diode 18 is coupled to the source of dual gate FET 11. The cathode of light emitting diode 18 is coupled to a second power supply node 17, typically operating at a ground potential.

Optoelectronic integrated circuit 10 is responsive to logic signals applied at second gate 13 which have TTL or standard CMOS logic compatibility. A logic high voltage level applied to second gate 13 turns on dual gate FET 11. Thus, a current $I_{15}$ flows from dual gate FET 11 into light emitting diode 18 thereby generating emission of light by diode 18.

A logic low voltage level applied at second gate 13 turns off dual gate FET 11 rendering dual gate FET 11 substantially nonconductive. Since current $I_{15}$ does not flow from dual gate FET 11 into light emitting diode 18 light is not emitted by diode 18.

As is obvious to those skilled in the art, second gate 13 functions as a switch to turn on or turn off dual gate FET 11 thereby controlling the flow of current $I_{15}$ to light emitting diode 18. As the voltage level at second gate 13 increases, dual gate FET 11 is gradually turned on thereby increasing the flow of current $I_{15}$. The power of the optical signal emitted by light emitting diode 18 is a function of current $I_{15}$, hence increasing current $I_{15}$ increases the light emitted by diode 18.

However, since first gate 12 is coupled to the source of FET 11, dual gate FET 11 enters saturation at a point determined by the device characteristics of FET 11.

Once FET 11 enters saturation further increases in the voltage at second gate 13 do not change current $I_{15}$. Thus, current $I_{15}$ delivered to light emitting diode 18 becomes substantially constant. Since current $I_{15}$ has reached a current saturation level, increasing the voltage at second gate 13 does not further increase the power of the optical signal emitted by light emitting diode 18.

The current limiting feature of dual gate FET 11 serves to protect both dual gate FET 11 and light emitting diode 18 from damage caused by excessive voltages appearing on second gate 13. Moreover, the means for current limiting also serves as a means for level shifting. A voltage drop occurs across a channel of dual gate FET 11 which, in conjunction with a voltage drop which occurs across light emitting diode 18, provides optoelectronic integrated circuit 10 with TTL compatibility.

FIG. 2 shows a schematic diagram of a second embodiment of a monolithic optoelectronic integrated circuit 20 having a first FET 22 and a second FET 21. First FET 22 and second FET 21 cooperate to serve as the drive circuitry for an optical emission device 18. Preferably, optical emission device 18 is a light emitting diode 18 having an anode and a cathode. Further, first FET 22 has a drain, a source, and a gate. Likewise, second FET 21 has a drain, a source, and a gate 23.

The drain of second FET 21 is coupled to a first power supply node 16, typically operating at a positive power supply voltage, $V_{DD}$. Gate 23 of second FET 21 serves as an input terminal for introducing electrical signals into optoelectronic integrated circuit 20. The source of second FET 21 is coupled to the drain of first FET 22. The gate of first FET 22 is coupled to the source of first FET 22. Moreover, the source of first FET 22 is coupled to the anode of light emitting diode 18. The cathode of light emitting diode 18 is coupled to a second power supply node 17, typically operating at ground potential. The operation of optoelectronic integrated circuit is similar to that of optoelectronic integrated circuit 10. Second FET 21 serves as a switch, whereas first FET 22 serves as a current limiting device as well as a means for voltage level shifting. Similar to the embodiment of optoelectronic integrated circuit 10, a logic high voltage, level applied at gate 23 turns on second FET 21 thereby supplying a current $I_{25}$ to first FET 2 and light emitting diode 18 Current $I_{25}$ flowing into light emitting diode 18 generates the emission of light from diode 18. Since the gate of first FET 22 is coupled to the source of first FET 22, first FET 22 enters saturation at a voltage level applied to gate 23 that is determined by device characteristics of FET 22. Further increases in the voltage at gate 23 of second FET 21 do not modulate current $I_{25}$. Hence, current $I_{25}$ delivered to light emitting diode 18 becomes substantially constant. Moreover, further increases in the voltage at gate 23 of second FET 21 do not further increase the power of the optical signal emitted by light emitting diode 18.

A logic low voltage level applied at gate 23 turns off second FET 21 rendering second FET 21 substantially nonconductive. Thus current $I_{25}$ does not flow from second FET 21 through first FET 22 into light emitting diode 18. Since current $I_{25}$ does not flow into diode 18, light is not emitted by light emitting diode 18.

Similar to the first embodiment of optoelectronic integrated circuit 10, FET 22 provides voltage level shifting as well as current limiting. Moreover the combination of a voltage drop across first FET 22 and the voltage drop across light emitting diode 18 provides optoelectronic integrated circuit 20 with TTL or standard CMOS logic compatibility.

It will be understood that the FETs 11, 21, and 22 of the present invention are depletion mode FETs having low magnitude pinch off voltages. However, the use of depletion mode FETs having low pinch off voltages is not a limitation of the present invention.

By now it should be appreciated that there has been provided an improved method for building low cost optoelectronic integrated circuits capable of mating with optical fibers. Moreover, the optoelectronic integrated circuit includes monolithically integrated optical emission and drive portions such that the optoelectronic integrated circuit is capable of being driven by logic voltage levels compatible with those of TTL and standard CMOS. Monolithically integrating the optical emission and drive portions allows the use of simpler, lower cost packaging. In addition, monolithic integration provides an improvement in the reliability of the optoelectronic integrated circuits over the present method of coupling discrete optical emission and drive portions.

Moreover, since the present invention is capable of accepting logic voltages compatible with those of TTL and CMOS standard logic, systems designers are relieved from the task of familiarizing themselves with the device characteristics of optoelectronic circuits.

Another advantage of the present invention is the ability to use a single positive voltage power supply thereby avoiding the task of designing around a split level power supply. In addition, each embodiment described for the present invention offers individual advantages. In the first embodiment the dual gate structure requires less wafer area than does the second embodiment. However, the second embodiment offers the advantage of tailoring the transistor parameters of each FET separately; as an example it may be desired that each FET have a different transconductance.

We claim:

1. A monolithic optoelectronic integrated circuit, which comprises:
- a light emitting diode having an anode and a cathode; and
- a dual gate depletion mode field effect transistor having a drain, a first gate, a second gate, and a source, the source coupled to both the first gate of the dual gate depletion mode field effect transistor and to the anode of the light emitting diode, the second gate serving as an input, and the drain coupled to a power supply conductor.

2. The monolithic optoelectronic integrated circuit of claim 1 in which the dual gate depletion mode field effect transistor has a small magnitude pinch off voltage.

3. The monolithic optoelectronic integrated circuit of claim 1 in which the monolithic integrated circuit operates from a single power supply.

4. A monolithic optoelectronic circuit driven by TTL or standard CMOS logic voltage levels and capable of being mated with an optical fiber, which comprises:
- an optical emission device; and
- a drive circuit coupled to the optical emission device, wherein the drive circuit includes at least one single gate field effect transistor and has current limiting and voltage level shifting capabilities.

5. The monolithic optoelectronic circuit of claim 4 in which power is supplied to the optoelectronic circuit from a single power supply.

6. A monolithic optoelectronic integrated circuit comprising an optical emission device coupled to a drive circuit, wherein the drive circuit comprises two field effect transistors, one field effect transistor performing a switching function, and another field effect transistor performing a current limiting function and also providing voltage level shifting.

7. The monolithic optoelectronic integrated circuit of claim 6 wherein the drive circuit accepts logic voltage levels compatible with TTL and standard CMOS logic circuitry.

8. The monolithic optoelectronic integrated circuit of claim 6 wherein a single power source supplies power to the monolithic optoelectronic integrated circuit.

9. A monolithic optoelectronic integrated circuit comprising an optical emission device coupled to a drive circuit, wherein the drive circuit comprises a dual gate field effect transistor having a switching portion, and a current limiting portion which also provides voltage level shifting.

10. The monolithic optoelectronic integrated circuit of claim 9 wherein the dual gate field effect transistor has a small magnitude pinch off voltage.

11. The monolithic optoelectronic integrated circuit of claim 9 wherein the drive circuit accepts logic voltage levels compatible with TTL and standard CMOS logic circuitry.

12. The monolithic optoelectronic integrated circuit of claim 9 wherein a single power source supplies power to the monolithic optoelectronic integrated circuit.

* * * * *